US008656894B2

(12) United States Patent  
Leroux et al.

(10) Patent No.: US 8,656,894 B2  
(45) Date of Patent: Feb. 25, 2014

(54) GAS INTAKE DEVICE

(75) Inventors: Samuel Leroux, Poissy (FR); Mathieu Lallemant, Maisons Laffite (FR); Arnold Rimpau, Braunschweig (DE); Christian Westphal, Meine (DE)

(73) Assignees: Valeo Systemes de Controle Moteur, Cergy (FR); Volkswagen AG, Wolfsburg (DE)

( * ) Notice: Subject to any disclaimer, the term of this patent is extended or adjusted under 35 U.S.C. 154(b) by 385 days.

(21) Appl. No.: 12/993,355

(22) PCT Filed: May 19, 2009

(86) PCT No.: PCT/IB2009/005658  
§ 371 (c)(1),  
(2), (4) Date: Nov. 18, 2010

(87) PCT Pub. No.: WO2009/141711  
PCT Pub. Date: Nov. 26, 2009

(65) Prior Publication Data  
US 2011/0088664 A1    Apr. 21, 2011

(30) Foreign Application Priority Data

May 20, 2008 (FR) ...................................... 08 02747

(51) Int. Cl.  
*F02M 15/00* (2006.01)  
*F02B 47/08* (2006.01)  
*F02F 1/42* (2006.01)

(52) U.S. Cl.  
USPC . 123/540; 123/542; 123/568.11; 123/568.12; 123/568.17; 123/568.18; 123/568.21; 123/188.14

(58) Field of Classification Search  
USPC .......... 123/540, 542, 568.11, 568.12, 568.17, 123/568.18, 568.21, 188.14  
See application file for complete search history.

(56) References Cited

U.S. PATENT DOCUMENTS

| | | | | |
|---|---|---|---|---|
| 2,651,507 A | * | 9/1953 | Heinecke | 165/103 |
| 4,030,465 A | * | 6/1977 | Nakagami et al. | 123/579 |
| 4,258,590 A | * | 3/1981 | Meijer et al. | 74/839 |
| 5,243,815 A | * | 9/1993 | Maier et al. | 60/796 |

(Continued)

FOREIGN PATENT DOCUMENTS

| CN | 101096936 A | 1/2008 |
|---|---|---|
| DE | 102004045661 A1 | 4/2006 |

(Continued)

OTHER PUBLICATIONS

International Search Report, dated Oct. 30, 2009, from corresponding PCT application.

(Continued)

*Primary Examiner* — Lindsay Low  
*Assistant Examiner* — Charles Brauch  
(74) *Attorney, Agent, or Firm* — Young & Thompson

(57) ABSTRACT

A gas intake device for letting gases into an inlet volume of a cylinder head of a motor vehicle combustion engine includes a valve (10) for supplying the cylinder head with gas, this valve communicating with the inlet volume of the cylinder head directly and indirectly via a heat exchanger (14). The valve (10) and the heat exchanger (14) are mounted on a plate (21) intended to be mounted directly on the cylinder head. The device is compact and relatively insensitive to vibration.

20 Claims, 2 Drawing Sheets

(56) References Cited

U.S. PATENT DOCUMENTS

| | | | |
|---|---|---|---|
| 6,684,840 B1 * | 2/2004 | Kuwano et al. | 123/184.21 |
| 6,895,948 B2 | 5/2005 | Mori et al. | |
| 7,032,577 B2 * | 4/2006 | Rosin et al. | 123/568.12 |
| 2001/0032631 A1 * | 10/2001 | Cook et al. | 123/568.12 |
| 2005/0072395 A1 * | 4/2005 | Bilger et al. | 123/195 R |
| 2005/0166887 A1 * | 8/2005 | Markou | 123/195 H |
| 2007/0084809 A1 * | 4/2007 | Bradu et al. | 211/59.4 |
| 2008/0257317 A1 * | 10/2008 | Cerabone et al. | 123/568.12 |
| 2009/0050830 A1 | 2/2009 | Albert et al. | |

FOREIGN PATENT DOCUMENTS

| | | | |
|---|---|---|---|
| DE | 102007029036 A1 | 12/2008 | |
| EP | 1496221 A2 | 1/2005 | |
| EP | 1533512 A2 * | 5/2005 | |
| FR | 2900455 A | 11/2007 | |
| FR | 2906017 A1 | 3/2008 | |
| FR | 2908833 A1 | 5/2008 | |
| GB | 421110 A | 12/1934 | |
| JP | 4244686 A | 1/1992 | |
| JP | H07332169 A | 12/1995 | |
| JP | 2004138023 A | 5/2004 | |
| JP | 2006118425 A | 5/2006 | |
| JP | 2008075522 A | 4/2008 | |
| WO | 2008034829 A1 | 3/2008 | |

OTHER PUBLICATIONS

Chinese Office Action, dated Nov. 2, 2012, from corresponding CN application.

Translation of Japanese Office Action, dated May 14, 2013, from corresponding JP application.

* cited by examiner

GAS INTAKE DEVICE

BACKGROUND OF THE INVENTION

1. Field of the Invention

The invention relates to a gas intake device for letting the said gases into the cylinder head of a motor vehicle combustion engine. The term "gases" is to be understood to mean air or a mixture of air and exhaust gas, to which liquid and/or gaseous fuel may have been added.

2. Description of the Related Art

A motor vehicle combustion engine comprises a combustion chamber, generally formed by a plurality of cylinders, in which a mixture of oxidant and fuel is burnt in order to generate engine work. The oxidant comprises air, which may or may not be compressed according to whether or not the engine is fitted with a turbocharger. The air may also be mixed with exhaust gases: these are then known as EGR (exhaust gas recirculation) gases. The gases admitted to the combustion chamber are termed inlet gases.

The inlet gases are received at an intake manifold, the English-language term "intake manifold" being widely understood by all those skilled in the art. The manifold is mounted on the cylinder head of the combustion chamber, at the inlet to the cylinder's. The gases may be cooled, partly cooled, or uncooled, depending on the engine speed. There are therefore two pipes leading into the manifold: one carrying the inlet gases directly into the manifold, and the other carrying them indirectly via a heat exchanger that can be used to cool the gases passing through it or, in some instances, to heat them.

Heat exchangers of the prior art are housed in a casing, generally made of plastic. Aside from the function of housing the heat exchanger, the casing is often designed also to form the inlet box and/or the outlet box of the heat exchanger. The casing also generally supports a certain number of other items such as, for example, parts of couplings, valves, the intake manifold, an exhaust gas intake module, etc., depending on the build of the engine.

Aside from these requirements to support things, the casing is subjected to pressure loadings associated with the flow of the compressed inlet gases. The lid of the casing in particular covers the entire casing and is subjected to all the pressure. What is more, this casing is subjected to the vibration generated by all the items it supports.

A casing such as this has therefore to be stiffened in order that it should not "inflate" under the pressure loadings or deteriorate on account of the vibration. Such stiffening is expensive and means making the casing heavier.

Furthermore, one of the objectives ever pursued by engine manufacturers is to make the inlet gas intake device as compact as possible.

BRIEF SUMMARY OF THE INVENTION

The invention sets out to propose a gas intake device which is compact while at the same time having good resistance to the pressure loadings within it.

To this end, the invention relates to a gas intake device for letting the said gases into an inlet volume of a cylinder head of a motor vehicle combustion engine, comprising a valve for supplying the cylinder head with gas, this valve communicating with the inlet volume of the cylinder head directly and indirectly via a heat exchanger, characterized in that the valve and the heat exchanger are mounted on a plate intended to be mounted directly on the cylinder head.

By virtue of the invention, the outlet box—or manifold—of the heat exchangers of the prior art is omitted. This manifold is replaced by a simple mounting plate. The difference between the volume created by an outlet box and the volume created by a plate may or may not be compensated for; in one embodiment, the volume of the cylinder head is increased to compensate for the loss of volume corresponding to the outlet box; for example, in this instance, the volume of the cylinder head may be increased by a volume equal to that of an outlet box of the prior art.

The mounting plate allows the intake device to be more rigid because the cooler and the valve, which are rigid items, are mounted directly on a mounting plate, unlike in the prior art where they were contained inside a plastic casing that was highly sensitive to vibration. Furthermore, because of the separation of the various items, it is possible to contrive for the exchanger and the valve to be mounted on the plate in such a way that there are no bolts located inside the volume or in communication with the volume of the cooler; thus, were a screw to work itself loose, there would be no risk of that screw being aspirated by the cylinders and damaging the engine. The gas intake device also becomes simpler to fit because all that is required is for the plate, on which the other items are mounted, to be fitted to the cylinder head.

According to one embodiment, the valve is a double valve comprising an inlet duct, a direct-outlet duct, mounted on the plate and opening directly into the inlet volume of the cylinder head, and an indirect-outlet duct, opening into an inlet box of the heat exchanger, which box is mounted, preferably directly, on the heat exchanger.

Thus, the device comprises the plate, on which the heat exchanger and the double valve are mounted, the inlet box being mounted on the heat exchanger and connected to the double valve. The fact that these self-contained items are separated but connected together further improves the rigidity of the whole and, if appropriate, makes it possible to avoid there being any screws in the communicating volumes.

According to one particular embodiment, the heat exchanger and the plate form the structural element of the intake device.

According to one embodiment, the plate is made of a solid material, in which at least two apertures are formed that allow fluidic communication with the inlet volume of the cylinder head.

According to one embodiment, the plate is made of a material that has a thermal conductivity suited to allowing heat exchanges between the valve and the cylinder head, in particular, the plate is made of a metallic material, for example of steel, of aluminium alloy or of aluminium.

Thus the plate, mounted directly on the cylinder head of the engine, which is a cold part of the engine, plays a part in cooling the valve by permitting exchanges of heat between the valve and the cylinder head. When it is made of metal, the plate also has good rigidity allowing it to be relatively insensitive to vibration and to fulfil a structural function.

According to one particular embodiment, the double valve comprises cooling fins, at least in the region of its direct-outlet duct, on the external surface thereof.

According to one particular embodiment, the cooling fins are positioned on the internal surface of the inlet box of the heat exchanger fulfilling a function of precooling the gas flowing through the inlet box.

According to one embodiment, the plate and the heat exchanger are formed as an integral entity.

According to one embodiment, the plate comprises a front face intended to be mounted on the cylinder head and a rear face intended to be mounted on the heat exchanger, the front and rear faces being at an angle to one another.

The invention also relates to a motor vehicle combustion engine comprising a combustion chamber, a cylinder head with an inlet volume and a gas intake device, for letting the said gases into the inlet volume of the cylinder head, the gas intake device having the features of the device set out hereinabove.

BRIEF DESCRIPTION OF THE DRAWINGS

The invention will be better understood from the following description of the preferred embodiment of the device and of the engine of the invention, with reference to the attached drawings, in which.

DETAILED DESCRIPTION OF THE PREFERRED EMBODIMENTS

Figure 1:
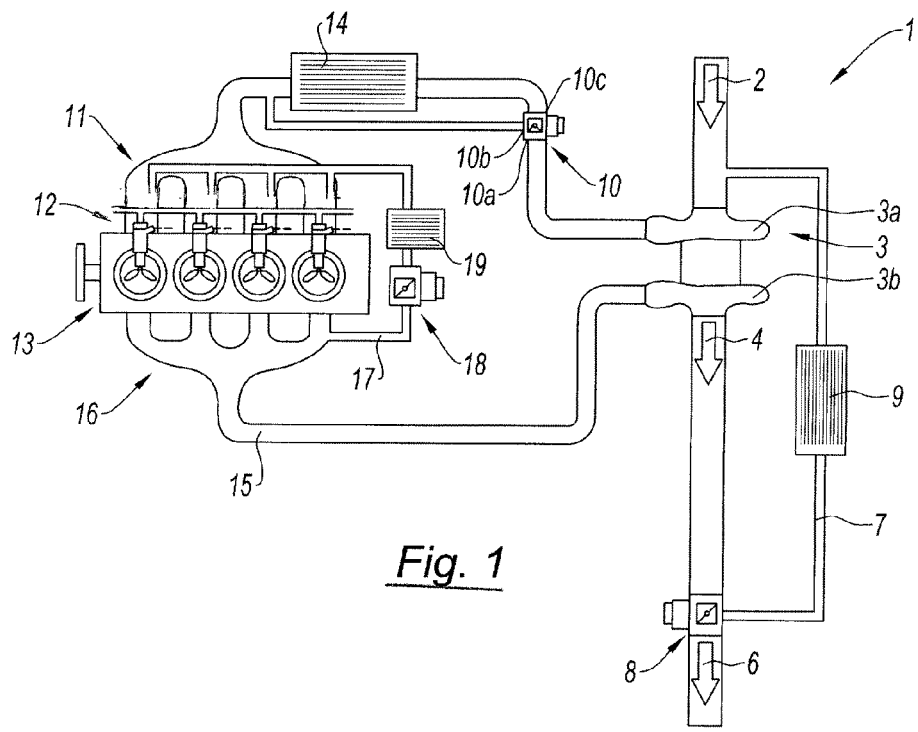
FIG. 1 is a functional block diagram of the architecture of the fluidic circuit for the gases of the engine of the invention.

With reference to FIG. 1, the engine 1 of the invention comprises a combustion chamber 13, in this instance made up of four cylinders in which pistons are mounted such that they can move, as is well known. The engine inlet air 2 is admitted via a turbocharger 3 comprising a compressor 3a, driven by a turbine 3b, the latter being driven by the exhaust gases 4. Having driven the turbine 3b, the exhaust gases 4 are either discharged via exhaust pipes 6 or "recirculated", that is to say reinjected into the inlet air stream 2. This exhaust gas recirculation is the said to be "low-pressure" exhaust gas recirculation. The EGR gases 7 are, for this purpose, tapped off at a valve 8, cooled in a low-pressure EGR heat exchanger 9 and injected into the inlet air stream 2 upstream of the compressor 3a. Mixing inlet air 2 with EGR gases 7 in this way makes it possible to reduce nitrogen oxides emissions.

The inlet gases 2, 7 therefore comprise, as they enter the compressor 3a, either only air 2, or a mixture of air 2 and of low-pressure EGR gases 7, which mixture is regulated by the valve 8 that regulates the recirculation of low-pressure exhaust gases 7. These inlet gases 2, 7 are compressed in the compressor 3a and carried to a valve 10 of a gas intake device 11 so that the said gases can be let into the inlet volume of the cylinder head 12 of the engine.

The cylinder head 12 is a well known part of a motor vehicle combustion engine. The cylinder head 12 forms the upper part of the engine. It is a casting, generally of cast iron or aluminium, which usually, on a four-stroke engine, as in the example described, comprises inlet ducts, exhaust ducts, water chambers in the case of liquid-cooled engines or fins in the case of air-cooled engines. The cylinder head 12 in particular creates an inlet volume for the intake of gases into the cylinders. In fact, the cylinder head 12 closes the tops of the cylinders of the combustion chamber 13 and forms part of the volume of this combustion chamber 13, as is known. When this description talks of letting gases into the cylinder head 12 or of direct and indirect communication between a valve and the cylinder head 12, this of course relates to letting into or communicating with the volume, of the cylinder head, for the intake (or inlet) of gases into the cylinders.

The inlet valve 10 of the device 11 is a double valve, that is to say that it comprises an inlet duct 10a and two outlet ducts 10b, 10c. The first outlet duct 10b opens directly into the inlet volume of the cylinder head 12; in that which follows, this duct will be known as the direct-outlet duct 10b. The second outlet duct 10c opens onto the inlet of a heat exchanger 14, the outlet of which opens into the inlet volume of the cylinder head 12; this second duct 10c therefore opens indirectly, via the said heat exchanger 14, into the inlet volume of the cylinder head 12; in what follows, that valve will be termed the indirect-outlet duct 10c. The heat exchanger in this instance is a cooler 14, that is to say that it is designed to cool the gas flowing through it. According to one particular embodiment, it may equally, in some modes of use of the engine, be used to heat the gas.

Thus, the inlet gases 2, 7 that enter the inlet duct 10a of the valve 10 may either be let directly into the cylinder head 12 via the direct-outlet duct 10b, or be let into the cylinder head 12 indirectly, via the indirect-outlet duct 10c, which forces them to pass via the heat exchanger 14. The double valve 10 is designed so that the inlet gases 2, 7 can pass in full or in part through one and/or the other of the outlet ducts 10b, 10c; it is thus possible to regulate the proportion of inlet gases 2, 7 undergoing heat treatment, for example cooling, and the proportion not undergoing such treatment.

The inlet gases 2, 7 are mixed with the fuel and burnt in the combustion chamber 13. On leaving the latter, the exhaust gases 15, which are at high pressure, are collected in an exhaust manifold 16 and directed towards the turbine 3b, as explained hereinabove.

Some of these high-pressure exhaust gases 17 may also be recirculated. An EGR pipe 17 is therefore formed on the exhaust manifold 16 so as to divert some of the flow of exhaust gases, the flow rate of these EGR gases 17 being regulated by a valve 18. These EGR gases 17 are cooled in a heat exchanger 19 and reinjected directly into the cylinder head 12. This is so-called "high-pressure" exhaust gas recirculation.

Thus, exhaust gases can be mixed with the inlet air 2 either upstream of the compressor 3a, through low-pressure EGR, or in the cylinder head 12, through high-pressure EGR.

The gas intake device 11 comprises the double valve 10, the heat exchanger 14, an inlet box 20 into the heat exchanger 14 and a mounting plate 21 or sole plate 21.

For the purposes of clarity, the items are discussed with reference to top (upper), bottom (lower) and right and left lateral positions; these positions are chosen relative to the orientation of the exchanger 14 in FIG. 2 but do not in any way prejudice the way in which the exchanger 14 (and therefore the gas intake device 11) can be mounted on an engine.

The heat exchanger 14 comprises an upper wall 22, a lower wall 23, a right-hand lateral wall 24 and a left-hand lateral wall 25. These walls 22, 23, 24, 25 are made of metal, in this instance aluminium. They form a metal box, that forms a structure or casing, within which the exchanger 14 comprises a stack (or bundle) of plates, not depicted, creating gas passages between them, between an inlet section 26 and an outlet section 27; the plates are hollow and a fluid, here a coolant, for example water, is designed to flow within them. Thus, the gases that pass through the heat exchanger 14 exchange heat, through the plates which are designed to be sufficiently thin, with the water that flows within these plates. The stack of plates therefore forms a means of exchanging heat with the inlet gases 2, 7 that pass through the heat exchanger 14 from the inlet section 26 to the outlet section 27. The coolant is supplied via an inlet pipe and an outlet pipe, not depicted, all of the plates communicating with each other. This then is what is known as a plate-type heat exchanger.

To sum up, a heat exchanger 14 such as this comprises a metal structure 22-25 defining an enclosure in which the means of exchanging heat with the gases that pass through the enclosure from the inlet section 26 to the outlet section 27 are located. This structure is well known to those skilled in the art and there is no need to expand further on it here. It goes without saying that any other heat exchanger of appropriate type may be employed.

According to the embodiment depicted, the heat exchanger 14 and the mounting plate 21 form structural elements of the gas intake device 11. What is meant by a structural element is a load-bearing structural element of the device. In particular, an element such as this, in this instance made of metal, has mechanical strength properties that allow it to support the other parts of the device—which are attached to it—while also providing the connection with the remainder of the engine, on which, by virtue of this element, the entire device can be mounted and held. Thus, the double valve 10 and the inlet box 20 of the exchanger 14 are mounted on the exchanger 14 and on the plate 21, the latter being mounted on the cylinder head 12 of the engine.

The mounting plate 21 is made of a solid material, in this instance of constant thickness, in this particular instance less than 3 cm and preferably between 0.5 and 2.5 cm thick. Formed in the plate 21 in this instance are at least two apertures that allow fluidic communication between, respectively, the double valve 10 and the exchanger 14, and the inlet volume of the cylinder head 12. In its left-hand part, it comprises a rectangular aperture 28, the dimensions of which correspond (and in this instance are equal) to those of the outlet section 27 of the heat exchanger 14. In its right-hand part it comprises a circular aperture 29 of which the cross section corresponds (and in this instance is identical) to the outlet section of the direct-outlet duct 10b of the double valve 10.

The direct-outlet duct 10b of the double valve 10 is fitted in the region of and around the circular aperture 29 of the mounting plate 21 and thus opens directly into the inlet volume of the cylinder head 12. The indirect-outlet duct 10c of the valve 10 is connected to a gas inlet orifice 20' via which gas enters the inlet box 20 of the heat exchanger 14. Because the cylinder head 12 forms directly, just after the plate 21, the outlet volume of the heat exchanger 14, the indirect-outlet duct 10c therefore communicates indirectly with the inlet volume of the cylinder head 12, via the heat exchanger 14. For this purpose, the inlet box 20 that lets inlet gas into the heat exchanger 14 defines a volume the front section 20" of which is open to face the inlet section 26 of the heat exchanger 14; the two sections 20", 26 in this instance are identical. The inlet box 20 therefore opens, in the region of its front section 20", into the heat exchanger 14 and, in the region of its inlet orifice 20', into the indirect-outlet duct 10c of the valve 10.

Thus, the inlet gases 2, 7, supplied to the inlet duct 10a of the double valve 10, can either flow through the direct-outlet duct 10b of the double valve 10 and open directly into the inlet volume of the cylinder head 12 or flow through the indirect-outlet duct 10c and open into the inlet box 20 of the heat exchanger 14, and then flow between the plates of this heat exchanger and, on leaving the exchanger 14, open into the inlet volume of the cylinder head 12.

More specifically, the inlet duct 10a and the two outlet ducts 10b, 10c may be designed in such a way that the incoming gases can flow either through the direct-outlet duct 10b, or through the indirect-outlet duct 10c, or through both; in the described embodiment of the invention, the gases cannot flow simultaneously through both ducts 10b, 10c because of the structure of the valve 10.

In this instance, the valve 10 comprises two butterflies, not depicted, each one lying in a respective outlet duct 10b, 10c. It goes without saying that absolutely any other flow regulating means can be envisaged in place of the butterflies, such as valve elements or shutters for example.

The butterflies may each be driven by a respective actuating motor. According to the described embodiment of the invention, a single motor 33 drives the two butterflies. The valve 10 may, for example, in this case be a valve such as the one described in U.S. Pat. No. 0,603,711 filed on 26 Apr. 2006 in the name of the Applicant company. A valve such as this does not allow all the possible options for the opening of the ducts 10b, 10c and merely allows the following three modes of operation:

a first mode in which the butterfly of the direct-outlet duct 10b is part-open or wide open, adjustably, between its closed position and its open position while the butterfly of the indirect-outlet duct 10c is closed;

a second mode in which both butterflies are closed; and a third mode in which the butterfly of the direct-outlet duct 10b is closed and the butterfly of the indirect-outlet duct 10c is open.

Switching from one mode to another can be achieved through special gearing connecting the motor 33 to the butterflies, as described in the aforementioned patent application.

With a double valve 10 such as this:

in the first mode of operation, the inlet gases 2, 7 are guided directly into the cylinder head 12, their flow rate being regulated by the butterfly of the direct-outlet duct 10b, which is open to a greater or lesser extent;

in the second mode of operation, the supply of gas to the cylinder head 12 is shut off; and in the third mode of operation, the inlet gases 2, 7 are guided indirectly into the cylinder head 12 via the heat exchanger 14.

It will be noted that with a double valve 10 such as this and as mentioned above, it is not possible to divide the inlet gases 2, 7 into two simultaneous streams, one direct and the other indirect, leading to the cylinder head 12; moreover, the indirect stream cannot be modulated (the butterfly of the indirect-outlet duct 10c is either open or closed). The double valve 10 may, of course, be designed to allow such modes of operation either by having two motors, each actuating one butterfly, or by using any other appropriate means. The advantage afforded by the valve 10 used here is that it is very compact and very simple to use.

The heat exchanger 14 is mounted on the mounting plate 21 by screwing, welding, riveting or any other appropriate means. Likewise, the double valve 10 is mounted on the plate 21 by any appropriate means, particularly by screwing through apertures 30 provided at the end of the indirect-outlet duct 10b. The inlet box 20 of the exchanger 14, which is a relatively lightweight item and the walls of which may be thin, is attached to the exchanger 14 by screwing, welding, riveting, adhesive bonding, fasteners, clips or any other appropriate means.

The mounting plate 21 is mounted on the cylinder head 12 of the engine, in this instance using screws. For this reason, the plate 21 has, in the embodiment shown, mounting lugs 31, each pierced with a hole 32 for a screw that is screwed into a corresponding hole in the cylinder head 12.

In this instance, according to one particular embodiment that has not been depicted, the mounting plate 21 is screw-fastened to the casing of the exchanger 14 using the same screw holes as used for screwing the plate 21 to the cylinder head 12. More specifically, the casing of the exchanger 14 may, in this instance, comprise, around its outlet section 27, a flange supporting mounting lugs, pierced with holes, designed to lie facing the lugs 31 and the holes 32 in the plate 21. Thus, the same screws can be used to mount the exchanger 14, the plate 21 and the cylinder head 12.

According to the embodiment depicted, the gas intake device 11 is preassembled, with the double valve 10, the heat exchanger 14, the casing 20 and the plate 21 mounted one on another as explained above, then the plate 21 is mounted on the cylinder head 12 to secure the entire entity in position.

The gas intake device 11 of the invention offers numerous advantages.

Firstly, the mounting plate 21 is a thin element, making the device 11 more compact. Next, the plate 21 is made of a strong material so can be thinner still.

In addition, the two heaviest items of the intake device 11 for letting gas into the cylinder head 12 are the heat exchanger 14 and the double valve 10. The fact that these two items are mounted on a rigid plate 21 mounted directly on the cylinder head 12 reduces the sensitivity of the device 11 to vibration.

Furthermore, the gas intake device 11 becomes easier to fit: once the box 20, the exchanger 14 and the valve 10 have been fitted on the mounting plate 21, the latter is simply mounted on the cylinder head 12.

Furthermore, and according to one embodiment, the mounting plate 21 is made of a material that has a thermal conductivity suited to allowing heat exchanges between the double valve 10 and the cylinder head 12. The greater the thermal conductivity, the greater these exchanges will be. In particular, the mounting plate 21 in this instance is made of a metallic material, more specifically of steel, of an aluminium alloy or of aluminium. By virtue of this thermal conductivity, the plate 21 fulfils a function of cooling the double valve 10 and, in particular, its drive motor 33. What happens is that it facilitates exchanges of heat between the cylinder head 12, which is a cold part of the engine, and the double valve 10. The cylinder head 12 is a cold part of the engine in so far as it is provided with numerous cooling means; thus, its temperature in the region in which the plate 21 is mounted is typically approximately 90°, allowing the double valve 10 and its drive motor 33 to be cooled.

The body of the double valve 10 is, for example, made chiefly of aluminium. Thus, heat exchanges take place readily between the cylinder head 12 and the drive motor 33 of the double valve 10, via the mounting plate 21 and the aluminium body of the double valve 10.

According to the particular embodiment described here, the double valve 10 comprises cooling fins 34, at least in the region of its direct-outlet duct 10b, on the external surface thereof, these fins providing better extraction of heat from the double valve 10, particularly its drive motor 33, to the cylinder head 12.

According to one particular embodiment, the inlet box 20 of the heat exchanger 14 is also made of a material that has good thermal conductivity, for example metal. Thus, the inlet box 20, the heat exchanger 14, the body of the double valve 10 and the mounting plate 21 form a heat-exchange assembly within which heat can pass easily.

According to one particular embodiment, cooling fins, not depicted, are positioned on the internal surface of the inlet box 20 of the heat exchanger 14. The gas intake device 11 thus fulfils a function of precooling the gas flowing through the inlet box 20. The fins, aside from cooling the gas before it enters the heat exchanger 14, also serve to homogenize this gas, thus encouraging the subsequent exchanges of heat within the heat exchanger 14. The sizing of the fins is the result of a compromise between the thermal efficiency and the pressure drop they introduce into the flow of gas flowing along them.

Figure 4:
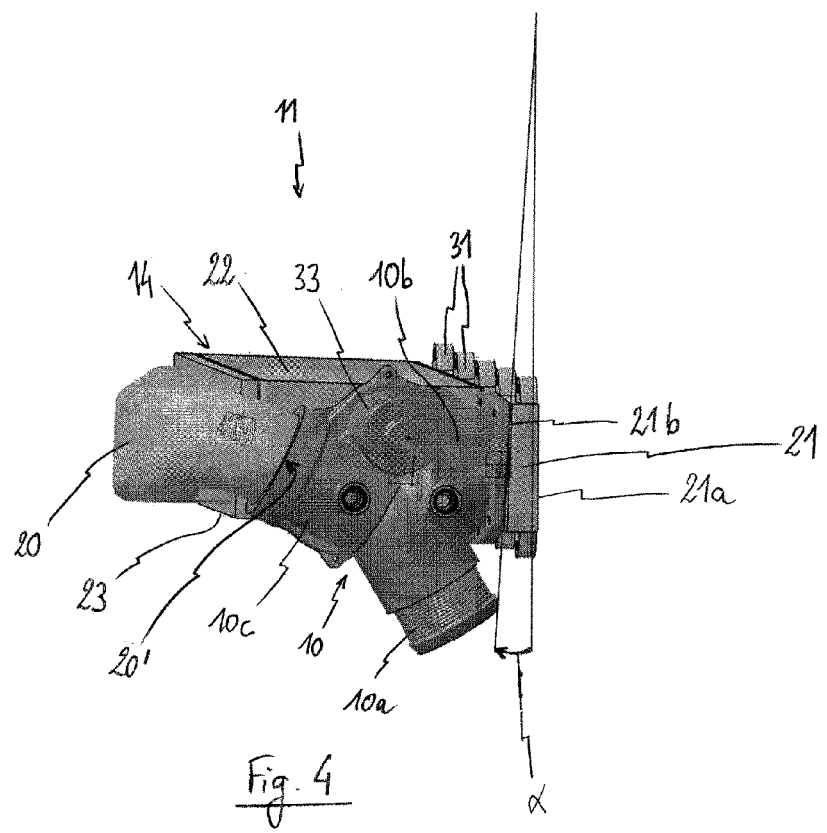
FIG. 4 depicts a side view of the device of FIG. 3.

In the embodiment described, and as can be seen in FIG. 4, the front 21a and rear 21b faces of the mounting plate 21 are at an angle a to one another. The plate 21 is mounted via its front face 21a on an upper surface of the cylinder head 12. Furthermore, the outlet section 27 of the heat exchanger 14 is mounted parallel to the rear face 21b of the plate 21. Thus, because of the angle a between the front face 21a and the rear face 21b of the plate 21, when the gas intake device 11 is mounted on the cylinder head 12, there is an angle between the outlet section 27 of the heat exchanger 14 and the upper surface of the cylinder head 12. Because this upper surface is generally horizontal, there is therefore an angle between the outlet section 27 of the heat exchanger 14 and the horizontal, which encourages the removal, in the cylinder head 12, of any condensates that may have formed in the exchanger 14.

Figure 2:
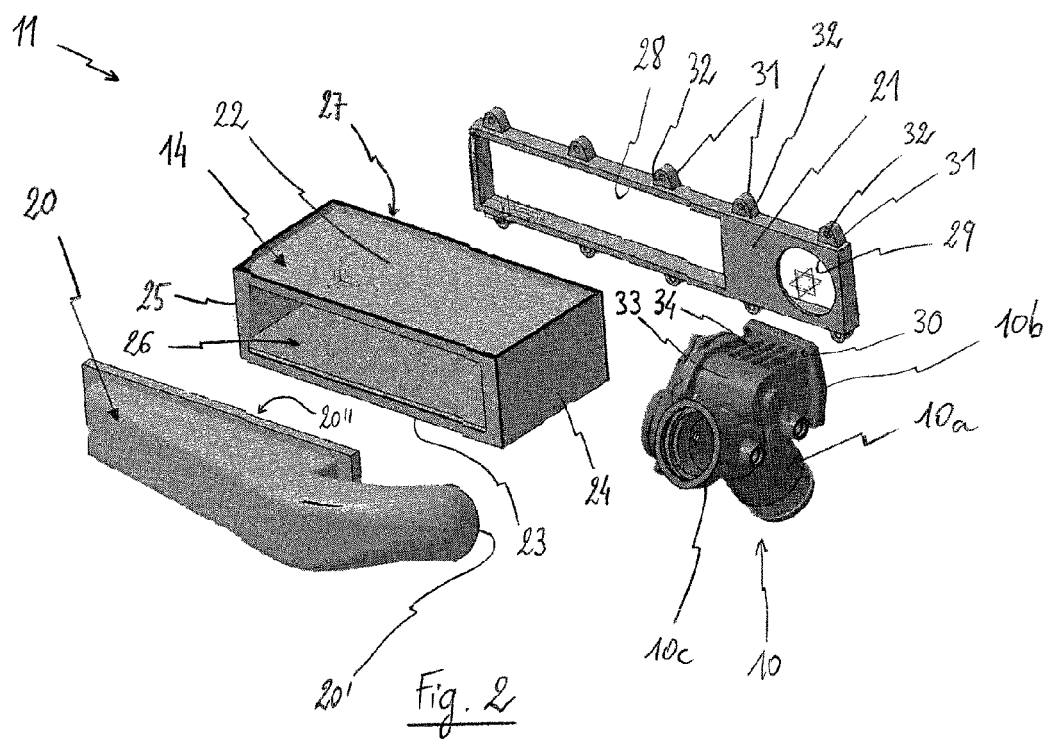
FIG. 2 depicts an exploded perspective view of one embodiment of the device of the invention.
Figure 3:
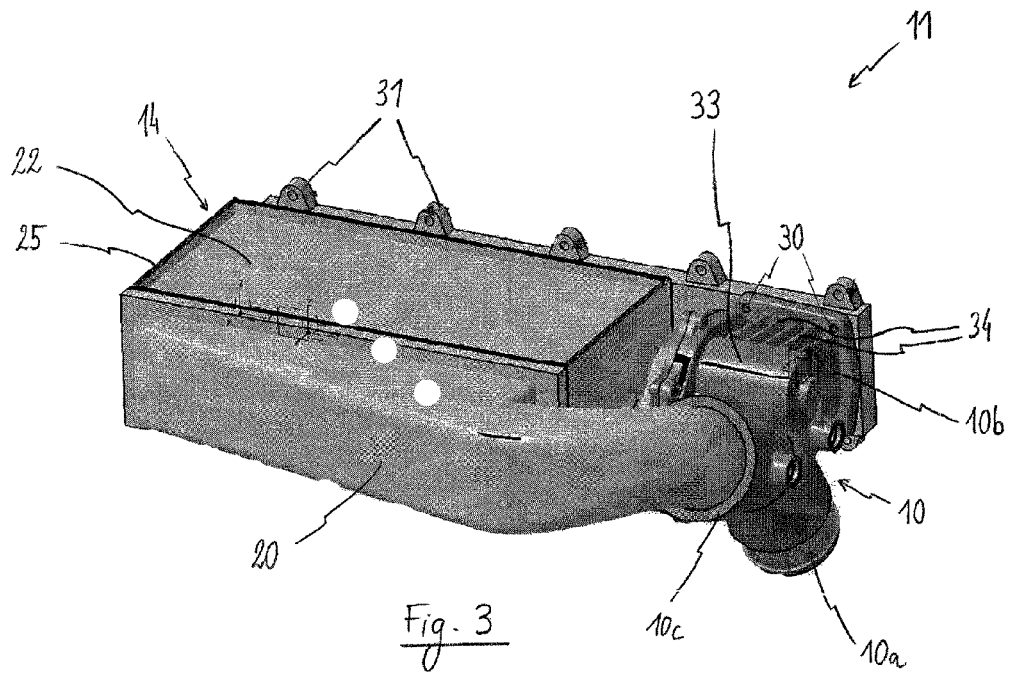
FIG. 3 depicts a perspective view of the device of FIG. 2, once it has been assembled.

According to an embodiment that is not depicted in FIGS. 2 to 4 but which was described above in conjunction with FIG. 1, a high-pressure EGR system 17 may be provided. A device such as this allows exhaust gases, tapped from the outlet of the engine cylinders, to be introduced into the inlet volume of the cylinder head 12.

In the embodiment described here, the inlet volume of the cylinder head 12 is increased by comparison with the inlet volume of cylinder heads of the prior art. This is because engines of the prior art comprise an air manifold that forms the outlet box of the heat exchanger and is mounted on the inlet volume of the cylinder head 12, whereas the engine of the invention simply has a plate plus the inlet volume of the cylinder head 12. If there is a desire for the volume through which the gases pass from the outlet section of the heat exchanger to the point at which they enter the cylinders to be as large as in the prior art—although this is not strictly necessary—then the inlet volume of the cylinder head 12 can be increased to compensate for the loss of volume due to the switch from a manifold to a plate 21; to do this, the cylinder head 12 may, for example, be made taller. It will be noted here that the volume of the cylinder head 12 forms the inlet volume for a plurality of cylinders; in other words, the said inlet volume of the cylinder head 12 forms a single volume opening onto all of the cylinders; its function is to supply the cylinders with gas.

According to an embodiment that has not been depicted, the plate 21 and the exchanger 14 are formed as an integral entity; in other words, the plate 21 is formed as a direct part with the casing of the exchanger 14, these two items 14, 21 forming a single piece. In fact, in such an instance, the heat exchanger 14, the casing of which comprises a portion that acts as the plate 21, is fitted directly on the cylinder head 12, with no intermediate component. In such an instance, the casing of the exchanger 14 is preferably extended by a projecting lug, pierced with an aperture, for attaching the valve 10; this lug performs the same function as the right-hand part of the plate 21, described above, with the aperture 29 on which the direct-outlet duct 10b of the double valve 10 is mounted.

The Applicant Company also intends to cover an intake device comprising an exchanger formed as one with its mounting plate mounted directly on the cylinder head, whether or not the said device comprises a valve for supplying the cylinder head with gas. When a valve such as this is not included in the intake device, it may be provided elsewhere in the gas supply circuit, preferably in this case upstream of the exchanger. There is no need to describe the elements (heat exchanger, plate) of an intake device such as this because their structure is similar to, or entirely comparable with, that of the elements of the device described hereinabove with reference to the figures.

The invention claimed is:

1. A gas intake device for allowing gases into an inlet volume of a cylinder head of a motor vehicle combustion engine, the gas intake device comprising:
   a heat exchanger;
   a valve configured to supply the cylinder head with gas, the valve communicating with the inlet volume of the cylinder head directly and indirectly via the heat exchanger; and
   a plate having a front face, a rear face directly opposite to the front face, a first aperture, and a second aperture, the first and second apertures being formed between the front face and the rear face, the plate being configured to be mounted directly on the cylinder head, the valve and the heat exchanger being mounted on the plate, the valve being mounted to the first aperture of the plate through which gas passes directly from the valve into the cylinder head, the heat exchanger being mounted to the second aperture of the plate through which gas passes directly from the heat exchanger into the cylinder head, the valve and the heat exchanger being mounted at the rear face of the plate directly opposite to the front face of the plate at which the plate is to be mounted directly on the cylinder head.

2. The device according to claim 1, wherein the valve is a double valve comprising an inlet duct, a direct-outlet duct mounted on the plate and opening directly into the inlet volume of the cylinder head, and an indirect-outlet duct, opening into an inlet box of the heat exchanger, the inlet box being mounted directly on the heat exchanger.

3. The device according to claim 1, wherein the heat exchanger and the plate form the structural element of the intake device.

4. The device according to claim 1, wherein the plate is made of a solid material, the apertures being formed to allow fluidic communication with the inlet volume of the cylinder head.

5. The device according to claim 2, wherein the plate is made of a metallic material that has a thermal conductivity suited to allowing heat exchanges between the valve and the cylinder head, the metallic material being one of steel, aluminum alloy or aluminum.

6. The device according to claim 5, wherein the double valve comprises cooling fins at least in the region of the direct-outlet duct (10b), on the external surface thereof.

7. The device according to claim 5, wherein the cooling fins are positioned on the internal surface of the inlet box of the heat exchanger in order to precool gas flowing through the inlet box.

8. The device according to claim 1, wherein the plate and the heat exchanger are formed as an integral entity.

9. The device according to claim 1, wherein the front and rear faces are at an angle to one another.

10. A motor vehicle combustion engine, comprising:
    a combustion chamber;
    a cylinder head with an inlet volume; and
    the gas intake device of claim 1 configured to allow gases into the inlet volume of the cylinder head.

11. The device according to claim 2, wherein the heat exchanger and the plate form the structural element of the intake device.

12. The device according to claim 2, wherein the plate is made of a solid material, the apertures being formed to allow fluidic communication with the inlet volume of the cylinder head.

13. The device according to claim 1, wherein the plate is made of a metallic material that has a thermal conductivity suited to allowing heat exchanges between the valve and the cylinder head, the metallic material being one of steel, aluminum alloy or aluminum.

14. A gas intake device for allowing gases into an inlet volume of a cylinder head of a motor vehicle combustion engine, the gas intake device comprising:
    a valve configured to supply the cylinder head with gas, the valve communicating with the inlet volume of the cylinder head directly through a direct outlet duct of the valve and indirectly via a heat exchanger, the valve and the heat exchanger being mounted on a plate configured to be mounted directly on the cylinder head, the plate including
    a first aperture through which gas passes directly from the valve into the cylinder head, the direct outlet duct being fitted around the first aperture, and
    a second aperture through which gas passes directly from the heat exchanger into the cylinder head, dimensions of the second aperture corresponding to dimensions of an outlet section of the heat exchanger,
    wherein the valve and the heat exchanger are mounted at a rear face of the plate directly opposite to a front face of the plate at which the plate is to be mounted directly on the cylinder head.

15. A gas intake device for allowing gases into an inlet volume of a cylinder head of a motor vehicle combustion engine, the gas intake device comprising:
    a valve configured to supply the cylinder head with gas, the valve communicating with the inlet volume of the cylinder head directly and indirectly via a heat exchanger, the valve and the heat exchanger being mounted at a rear face of a plate directly opposite to a front face of the plate at which the plate is configured to be mounted directly on the cylinder head, the valve being a double valve comprising
    an inlet duct,
    a direct outlet duct, the direct outlet duct being mounted to a first aperture of the plate through which gas passes directly from the valve into the cylinder head, the direct outlet duct opening directly into the cylinder head, and
    an indirect outlet duct, the indirect outlet duct opening into an inlet box of the heat exchanger, the heat exchanger being mounted to a second aperture of the plate through which gas passes through the indirect outlet duct to the heat exchanger and directly from the heat exchanger into the cylinder head.

16. The device according to claim 15, wherein the first aperture allows for fluidic communication between the double valve and the inlet volume, and
    the second aperture allows for fluidic communication between the heat exchanger and said inlet volume, dimensions of the second aperture corresponding to dimensions of an outlet section of the heat exchanger.

17. The device according to claim 1, wherein the heat exchanger is affixed to the plate by first fasteners, and the valve is affixed to the plate by second fasteners.

18. The device according to claim 17, wherein the first fasteners are configured to fix the plate on the cylinder head.

19. The device according to claim 1, wherein the plate is less than 3 cm thick.

20. The device according to claim 1, wherein the valve and the heat exchanger are directly mounted onto the plate.

* * * * *

UNITED STATES PATENT AND TRADEMARK OFFICE
CERTIFICATE OF CORRECTION

PATENT NO. : 8,656,894 B2 Page 1 of 1
APPLICATION NO. : 12/993355
DATED : February 25, 2014
INVENTOR(S) : Leroux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Twenty-ninth Day of September, 2015

Michelle K. Lee
*Director of the United States Patent and Trademark Office*